J. O. LUTHY.
BATTERY TERMINAL.
APPLICATION FILED JULY 1, 1918.
1,300,431.
Patented Apr. 15, 1919.
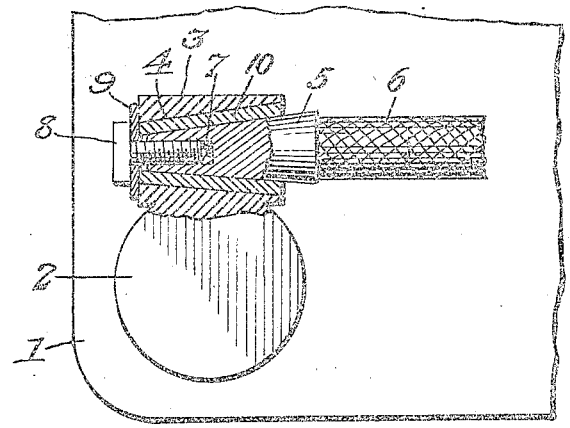
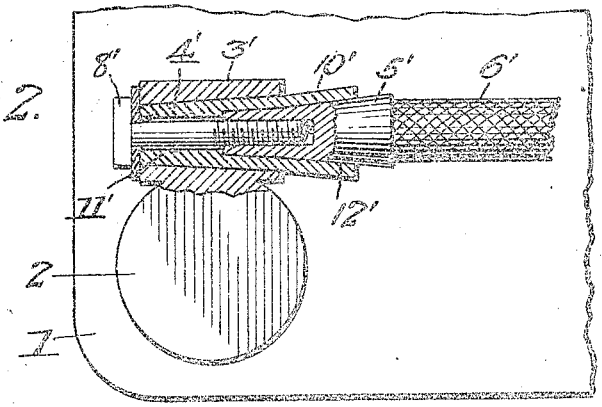
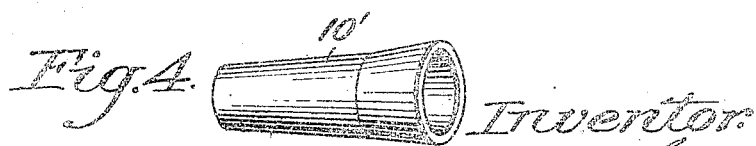
Inventor.
Joseph O. Luthy

UNITED STATES PATENT OFFICE.

JOSEPH O. LUTHY, OF SAN ANTONIO, TEXAS.

BATTERY-TERMINAL.

1,300,431.

Specification of Letters Patent. Patented Apr. 15, 1919.

Application filed July 1, 1918. Serial No. 242,790.

*To all whom it may concern:*

Be it known that I, JOSEPH O. LUTHY, a citizen of the United States, residing at San Antonio, in the county of Bexar, in the State of Texas, have invented certain new and useful Improvements in Battery-Terminals; and I do hereby declare the following to be a full, clear, and exact description of the invention, such as will enable others skilled in the art to which it appertains to make and use the same.

In electrical systems where storage batteries are used, it is oft times necessary to replace the batteries, either permanently or temporarily. For instance, in the lighting, starting and ignition systems of automobiles, periodically the batteries must be replaced. It is a common practice to substitute a battery in a lighting, starting and ignition system, for a battery which must be recharged or repaired. There is a common type of battery wherein the terminals are tapered sockets, usually frusto-conical in form. With these tapered sockets, similarly tapered conductor terminals are adapted to engage. When one battery is substituted for another it very often occurs that the tapered conductor terminals are either too large or too small for the socket terminals of the new battery, so that it is very difficult under ordinary conditions to properly attach the conductor terminals to the battery.

I have provided means whereby the socket terminals of the batteries will be adapted to conductor terminals of various sizes.

In the drawing:

Figure 1 is a plan view of a battery with a socket terminal and bushing thereof in section, and with the conductor terminal partly broken away, the bushing illustrated being that used when the socket terminal of the battery is too large to accommodate the tapered terminal of the conductor;

Fig. 2 is a similar view illustrating the bushing used when the socket terminal is too small to accommodate the conductor terminal;

Fig. 3 is a perspective view of the bushing illustrated in Fig. 1, and

Fig. 4 is a perspective view of the bushing illustrated in Fig. 2.

In Fig. 1 of the drawing the battery is indicated generally by the reference character 1, and the battery terminal by the character 2. This terminal includes a socket member 3, which is provided with a frusto-conical opening 4 adapted to receive the tapered terminal 5 of the conductor 6. This terminal 5 is provided in its end with a threaded opening 7, into which a screw 8 is adapted to extend. This screw 8 passes through a lock washer 9, and when in threaded engagement with the opening 7 secures the conductor terminal 5 within the socket member 3. The embodiment of the invention illustrated in Fig. 1 includes a frusto-conical bushing 10, which is located within the frusto-conical opening 4 of the socket member 3. This bushing is preferably made of a lead composition, which contains a considerable percentage of antimony, which renders the bushing relatively hard and, therefore, suitable for commercial purposes. When the conductor terminal 5 is too small to be drawn tightly into the socket member 3 by the screw 8, as illustrated in Fig. 1, the bushing 10 is placed in the opening 4 of the socket member 3 and the terminal 5 of the conductor 6 inserted in the bushing. The tightening of the screw 8 draws the terminal 5 tightly into engagement with the bushing 10 and also draws the bushing 10 tightly into engagement with the wall of the opening 4, so that a perfect contact is made.

In the form of the invention illustrated in Fig. 2, wherein the parts corresponding to those illustrated in Fig. 1, are indicated by the same reference characters primed, the bushing 10' is of the type used when the terminal 5' of the conductor 6' is too large to fit into the opening 4' of the socket member 3'. This bushing 10' is provided with an opening 11', through which the screw 8' passes, and is provided with a tapered opening 12', into which the terminal 5' of the conductor 6' extends. The tightening of the screw 8' in this form of the invention likewise draws the terminal 5' into intimate contact with the inner wall of the bushing 10' and also draws the outer surfaces of the bushing into intimate contact with the wall of the opening 4' in the socket member 3'.

With these two forms of the invention, the socket may be adapted to receive conductor terminals of various sizes, irrespective of whether or not the terminals are too large or too small to properly fit in and contact with the socket members themselves.

This invention is particularly useful at battery service stations, for great difficulty has been experienced in connecting the various sized conductor terminals to the various sized battery terminals of the tapered socket type. The invention is particularly simple and readily adapts the sockets to the various sized conductor terminals with the consumption of the minimum time and labor, and furthermore, the contact produced between the conductor terminals and the battery terminals is effective and positive, and there is no likelihood of the contact being broken during the jars incident to the use of a battery on a lighting, starting and ignition system of an automobile.

While I have described the invention as being particularly useful in lighting, starting and ignition systems of automobiles, it is, of course, to be understood that its use is not limited to such systems, as it can be very readily used in other connections wherever a battery of the tapered terminal type is used.

What I claim is:

1. The combination with a battery terminal having a tapered socket and a tapered conductor terminal, of a bushing removably interposed between the battery and conductor terminals, and means for drawing the conductor terminal tightly into engagement with the bushing and the bushing tightly into engagement with the battery terminal.

2. The combination with an electric terminal including a tapered socket member and a tapered conductor terminal, of a bushing removably arranged within the socket member to receive the conductor terminal, and a screw passing through the bushing and engaged with the conductor terminal to bind the parts together.

3. The combination with a battery terminal having a tapered socket which is adapted to receive tapered conductor terminals of a bushing removably mounted in the socket to vary the range of the same.

In testimony whereof I affix my signature.

JOSEPH O. LUTHY.